April 18, 1961  D. D. NUSBAUM  2,980,542
CHEESE TREATMENT
Filed Aug. 3, 1951
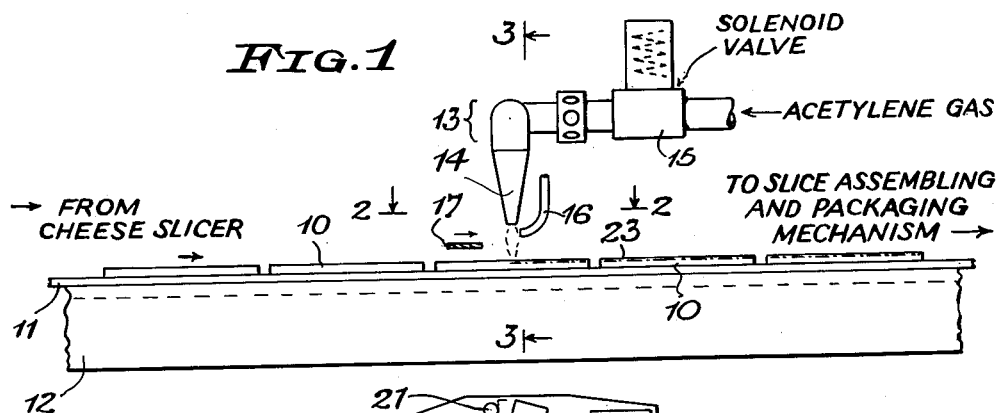
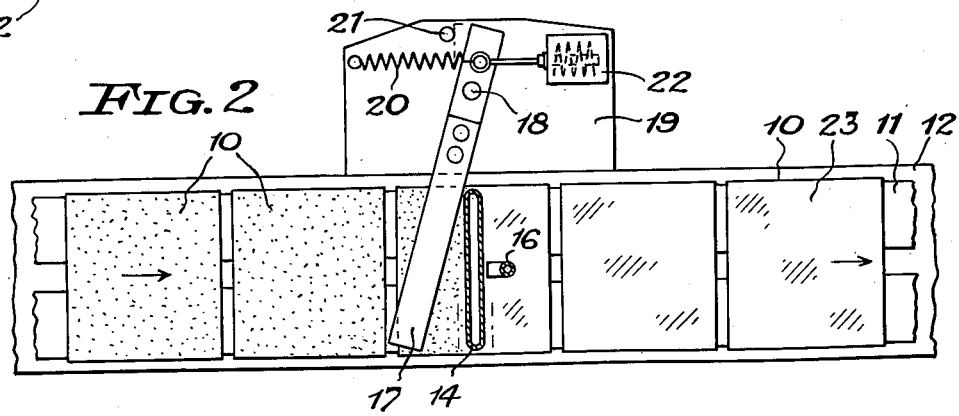
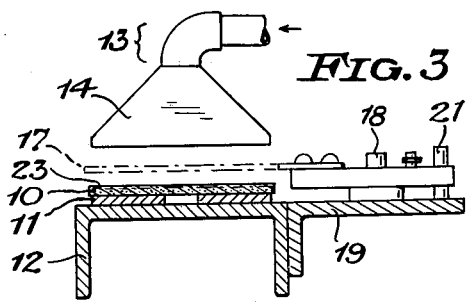
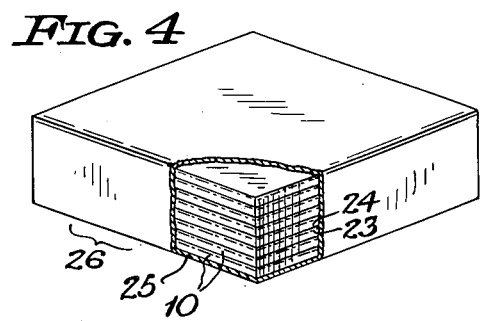
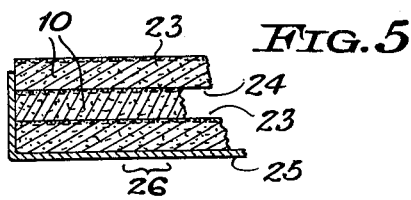
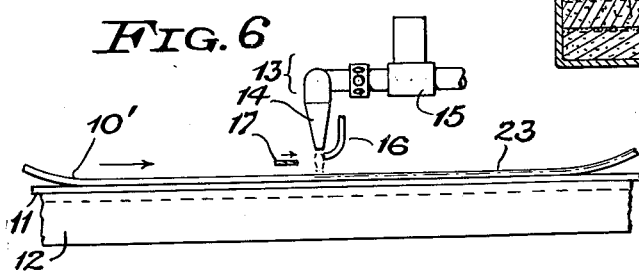
INVENTOR
D. DAVID NUSBAUM
BY Christopher L. Waal
ATTORNEY

United States Patent Office 2,980,542
Patented Apr. 18, 1961

2,980,542
CHEESE TREATMENT

Daniel David Nusbaum, West De Pere, Wis., assignor to L. D. Schreiber & Co., Inc., Green Bay, Wis., a corporation of Delaware Filed Aug. 3, 1951, Ser. No. 240,225

1 Claim. (Cl. 99—178)

The present invention relates to improvements in the treatment of cheese, and to mutlilayer assemblies of cheese in sheet form.

It has heretofore been proposed to market cheese in packages containing cheese sheets or slices, such as of a size and thickness suitable for making sandwiches. A disadvantage which has been encountered is the tendency of the abutting cheese sheets to adhere to each other, particularly in the case of soft cheese such as process cheese when not kept under refrigeration. Another disadvantage is the tendency of the cheese sheets to develop mold at their abutting faces.

An object of the invention is to provide an improved method of treating the surface of sheet cheese to minimize adhesion between layers of the cheese when subsequently assembled or packaged, and further to inhibit the development of mold between the cheese layers.

Another object is to provide simple and inexpensive apparatus for heat treating the sheet cheese to form adhesion-minimizing and mold-inhibiting films thereon.

Still another object is to provide a method and apparatus of this character which can readily be used in conjunction with conventional cheese handling equipment.

A further object is to provide an improved assembly or package of multilayer sheet cheese in which the cheese layers can easily be separated from each other even though the cheese may become warm.

The invention further consists in the several features hereinafter described and claimed.

In the accompanying drawing,

Fig. 1 is a side elevation of a cheese treating apparatus of the invention adapted for carrying out the method of the invention, parts being shown in section;

Fig. 2 is a top view of the apparatus, parts being shown in section on the line 2—2 of Fig. 1;

Fig. 3 is a transverse sectional view of the apparatus, taken generally on the line 2—2 of Fig. 1;

Fig. 4 is a perspective view of a multilayer cheese package of the invention, including cheese sheets treated in accordance with the invention, parts of a wrapper being broken away and parts thereof being shown in section;

Fig. 5 is an enlarged sectional view of a portion of the cheese package, and

Fig. 6 is a view similar to Fig. 1 but showing the apparatus operating on a ribbon of sheet cheese.

In carrying out the method of the invention, cheese in sheet form has a face thereof momentarily subjected to a dehydrating heat treatment, such as by a flame, to so modify the physical characteristics of a thin surface film of the cheese as to minimize or materially reduce adhesion between abutting layers of the cheese when it is subsequently packaged.

The sheet cheese to be heat treated is preferably in the form of freshly cut slices 10, such as of process cheese. These slices may be cut from loaves or blocks by one or more conventional slicing machines, not shown, and are desirably of a size and thickness suitable for sandwich making. The slices are deposited in succession on the upper run of a horizontal belt conveyor 11 which is supported on a suitable frame 12. The belt conveyor may be either metallic or non-metallic and in some instances may comprise two spaced parallel sections, as shown. The cheese slices are here shown to be closely and uniformly spaced, although wider and random spacing may be used. A heater 13 is arranged above the conveyor out of the path of the cheese slices and preferably comprises a burner the radiant flame of which impinges on the top surface of the moving cheese slices along a strip-like zone or band extending transversely of the direction of travel of the slices. The burner illustrated is of the air-acetylene type and includes a downwardly directed fish-tail discharge nozzle 14 extending transversely above the conveyor. The burner may operate either continuously or intermittently and is suitably controlled, as by a solenoid-operated valve 15 and a pilot light 16. In addition, a movably mounted metal shield or deflector 17 may be provided to intercept the flame and thus prevent heating of the conveyor in the absence of cheese slices. The shield is swingably carried on a vertical pivot 18 mounted on a bracket 19 secured to the conveyor frame. A spring 20 urges the shield to shielding position against a stop 21, and a solenoid 22 serves to swing the shield out of shielding position, as seen in Fig. 2. The burner valve and shield may be either manually or automatically controlled. By way of example, the solenoids may be under the control of photo-electric means, not shown, responsive to the presence and travel of the cheese sheets.

The cheese slices 10 deposited on the conveyor 11 are relatively cool or at room temperature. In its passage under the transversely extending burner flame, each cheese slice has its upper surface swept by the burner flame, causing a thin surface film 23 of the cheese to be physically modified to such a condition as to minimize adhesion of the slice to an abutting slice after subsequent packaging. By way of example, a conveyor speed of about 60 feet per minute and a flame temperature of about 1800° F. will provide the desired film formation. The duration of the heat treatment on any particular area of the slice is a small fraction of a second. The heating effect of the flame is confined to the thin surface film 23 of the cheese slice, the main body of the slice remaining comparatively cool. The surface film is only a few thousandths of an inch thick and cools rapidly after leaving the flame. The film presents a smooth, glazed, non-tacky surface on the cheese slice, and forms a sealing barrier to the migration of fat and moisture to the surface. The heat treatment of the cheese sheets is effected without requiring contact of the heater structure with the cheese surface. The flame, which has a temperature well above the melting point of the cheese, also serves to destroy mold spores.

The flame and the current of hot gas thereof have a dehydrating effect on the freshly cut surfaces of the cheese slices. While the exact character of the film formed on the cheese slices by the heat treatment is not definitely known, it appears that for at least some types of cheese, the heat treatment produces a superficial reversal of emulsion phase on the cut surfaces of the cheese slices, leaving a continuous oil film on the cut surfaces.

After the heat treatment, the cheese sheets or slices are assembled in stacks, either manually or by any suitable assembling mechanism, the heat treated surface film 23 of one sheet abutting the untreated surface 24 of the adjacent sheet. Each stack of cheese sheets or slices is then enclosed in a sealing wrapper 25 to form a cheese package 26.

The heat treated surface films 23 prevent adhesion of the adjacent cheese sheets, even if the cheese becomes quite warm. The cheese sheets may thus be freely separated after the package is opened by the consumer. The heat treatment of the cheese also serves to inhibit mold formation between the abutting faces of the cheese sheets.

While it is preferred to form the cheese sheets or slices to their final size before the heat treatment, it is also possible to apply the heat treatment to cheese in the forms of ribbons or wider sheets which are subsequently subdivided into segments of the desired size. By way of example, a cheese ribbon may be cut from a wheel of cheese, or may be formed in other ways. In Fig. 6, a cheese ribbon 10' is carried on the conveyor 11 and is passed under a heater 13 which is preferably a burner as in Fig. 1. In some instances the heater may be of the radiant type. However, heating of sheet cheese or cheese slices by radiant heat alone will require a much longer heating period than by the use of a flame, and the heating period will be increased with reduction in the intensity of radiation.

What I claim as new and desire to secure by Letters Patent is:

A method of preparing for packaging a stack of non-adhering slices of cheese which normally constitutes an emulsion in which butter fat is in a discontinuous phase in a continuous phase of hydrated protein, said method comprising the steps of slicing the cheese and thereupon effecting superficial reversal of emulsion phase on the freshly cut surfaces of the slices by dehydrating such surfaces until an oil film develops thereon, the superficial dehydration and phase reversal being effected by thermal radiation of the cut slice surfaces, followed by the further step of assembling the irradiated slices in a stack in which the oil films on the cut surfaces intervene between the normal cheese emulsions of the slices, the said oil films rendering the slices readily separable and substantially mold-free during commercial handling, the cheese being cold when sliced and the slices being cold when irradiated, the step of irradiation being terminated before the cheese of the slice below the irradiated surface becomes warmed substantially above its starting temperature.

References Cited in the file of this patent
UNITED STATES PATENTS

| | | |
|---|---|---|
| 1,362,736 | Pittman | Dec. 21, 1920 |
| 1,367,049 | Jackman | Feb. 1, 1921 |
| 1,492,388 | Popper | Apr. 29, 1924 |
| 1,523,678 | Wheeler et al. | Jan. 20, 1925 |
| 1,536,538 | Stouffer | May 5, 1925 |
| 1,538,245 | Hulbert | May 19, 1925 |
| 1,595,954 | Leavitt | Aug. 10, 1926 |
| 1,660,061 | Addison | Feb. 21, 1928 |
| 1,862,733 | Wright | June 14, 1932 |
| 1,935,618 | Davidson et al. | Nov. 21, 1933 |
| 1,981,986 | Bruhn | Nov. 27, 1934 |
| 1,988,230 | Avery | Jan. 15, 1935 |
| 2,304,591 | Pape et al. | Dec. 8, 1942 |
| 2,319,187 | Ingle | May 11, 1943 |
| 2,383,352 | Snyder | Aug. 21, 1945 |
| 2,388,762 | Powers | Nov. 13, 1945 |
| 2,565,174 | Fredenhagen | Aug. 21, 1951 |
| 2,684,905 | Grindrod | July 27, 1954 |